United States Patent
Stummer et al.

(10) Patent No.: US 6,678,088 B1
(45) Date of Patent: Jan. 13, 2004

(54) OPTICAL AMPLIFIER TRANSIENT CONTROL APPARATUS

(75) Inventors: Alan Stummer, Thornhill (CA); Jun Bao, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 10/137,926

(22) Filed: May 2, 2002

(51) Int. Cl.[7] .................................................. H01S 3/00
(52) U.S. Cl. .............................. 359/341.41; 359/341.43
(58) Field of Search ........................ 359/341.43, 341.41, 359/341.4

(56) References Cited

U.S. PATENT DOCUMENTS 5,703,711 A * 12/1997 Hamada ..................... 359/341
5,822,112 A * 10/1998 Itou et al. ................... 359/341
6,498,677 B1 * 12/2002 Sun et al. .................. 359/341.4
6,501,595 B1 * 12/2002 Drake et al. ............. 359/341.43

* cited by examiner

Primary Examiner—Mark Hellner
(74) Attorney, Agent, or Firm—Michael R. Cammarata

(57) ABSTRACT

An optical amplifier control circuit and method controls transients and avoids the problems associated with measuring gain. The input power level is detected and amplified by a transient control setting to provide a desired gain value against which is compared the output power level. This transient control error may be used in conjunction with a constant power error and/or a constant current error such that the lowest of the error values is used to drive the pump laser. Current and power feedback signals and settings are used to derive the error values. Multiple pump lasers per stage may also be controlled and a multi-stage amp having a cascaded structure may be realized using the inventive techniques.

21 Claims, 7 Drawing Sheets

OPTICAL AMPLIFIER TRANSIENT CONTROL APPARATUS

BACKGROUND OF THE INVENTION

1. Field of Invention

The invention generally relates to controlling an optical amplifier. More particularly, the invention relates to circuits and apparatuses that control optical amplifiers having a fiber segment doped with an optically active material.

2. Description of Related Art

A variety of techniques have been employed to control optical amplifiers. One such conventional technique is the constant gain control loop. The conventional constant gain control loop is simple: measure the input and output powers and calculate the gain based on the input (Pin) and output (Pout) power measurements (measured gain=Pout/Pin). Changes are then made to the amplifier pump power such that the measured gain achieves the pre-stored or target gain value. In this way, it is possible to control the amplifier module to have a constant gain value regardless of changes to the input power level such as when optical WDM (wavelength division multiplexed) channel(s) are added or dropped.

In other words, traditional optical amplifier control works by comparing the measured optical gain (Pout/Pin) to a set (or target) gain, usually through digital means. This usually results in a series of discrete corrections to the pump laser(s) drive(s). As the input power approaches zero, however, severe problems arise because of the division by zero problem, see equation A) below.

Typical equations for the traditional optical amplifier constant gain control are:

A) Gmeas=Pout/Pin, where Gmeas is measured optical gain, Pin is optical input power, Pout is optical output power.

B) Gerr=Gmeas/Gset, where Gerr is gain error, Gset is the set gain. This equation can also be inverted, depending on following gain stages.

C) Pump laser drive(s) is the integral of Gmeas or Gerr.

While it is possible to compensate for this division by zero problem by switching to other equations when the input power (Pin) approaches zero, a discontinuity at the switchover point may occur which can cause noise and an inaccurate pump power level setting. Other functions may include undesirable nonlinearities.

Furthermore, such conventional constant gain control schemes use digital implementations because of the difficulty in measuring gain in analog circuitry. This difficulty partially stems from the very poor performance of analog circuits measuring voltage ratios. More significant is the dynamic range required for the application. For example, 10 mV in and 100 mV out would have to produce the same gain voltage (equivalent to a gain of 10) as 0.4V in and 4V out, a 40:1 dynamic range. As a further example consider a circuit having 10 mV in and 1V out: it would have to produce a voltage equivalent to a gain of 100, ten times higher voltage than the first example. Both issues apply for very low or zero inputs. One conventional solution is to narrow both the dynamic range of the acceptable inputs and the acceptable gains which is a serious compromise.

This invention does not require gain to be measured and does not measure or determine voltage ratios but instead compares the measured optical output power against the expected optical power, a function that is simple and fast to do in analog circuitry with no inherent non-linearities and which does not have the division by zero problem experienced by conventional constant gain control devices.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1:
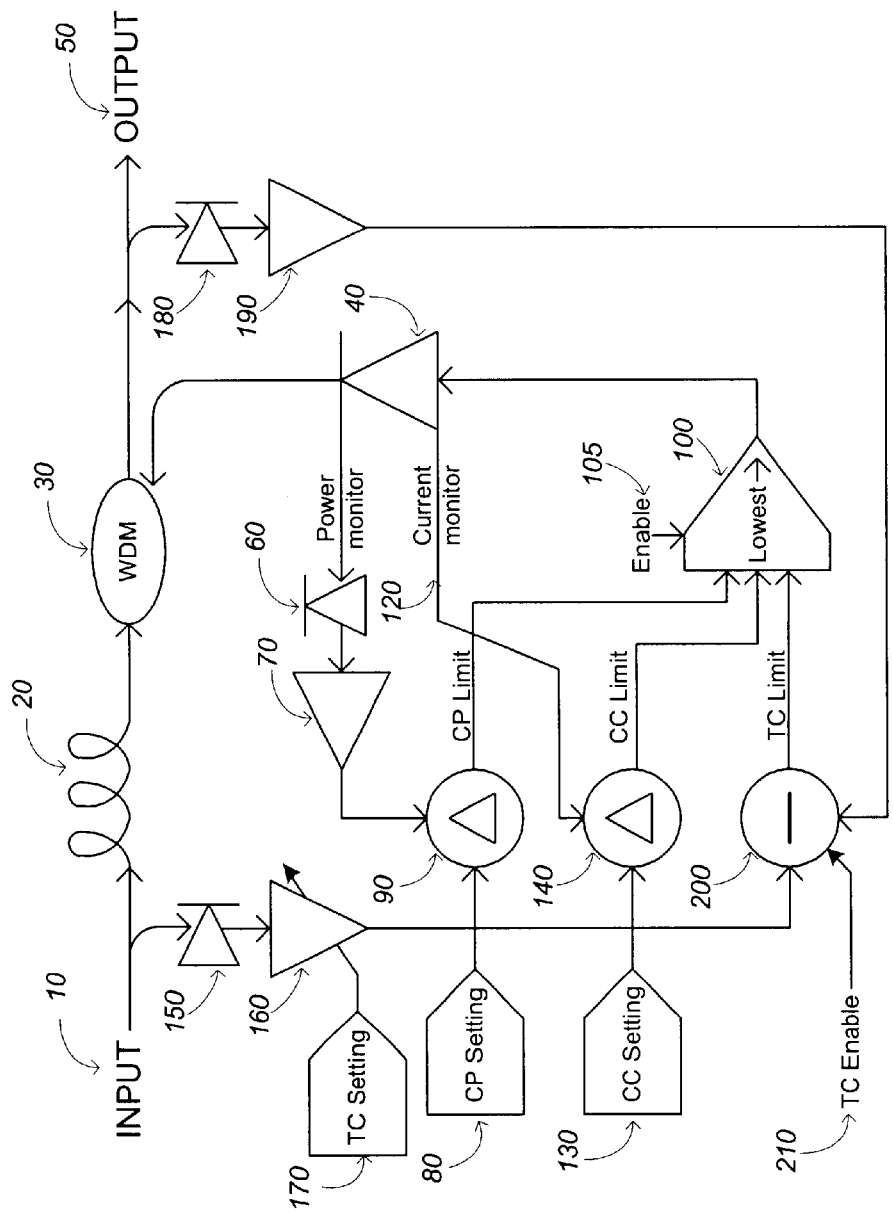
FIG. 1 is a high level block diagram illustrating an amplifier control apparatus implementing transient control, constant power control and constant current control circuits according to an embodiment of the invention.

FIG. 1 illustrates a conventional single stage fiber amplifier including a segment of doped fiber 20 doped with an optically active material, an input 10 and an output 50. Optical fiber is conventionally doped with an optically active material, such as erbium or other rare earth element(s) to produce a gain medium. Generally, the core region of the optical fiber contains the dopant, which is optically excited to provide optical gain to an optical signal having a suitable wavelength. The dopant may be excited by subjecting it to an optical pump signal of a suitable pump wavelength. For example, an erbium-doped fiber amplifier (EDFA) amplifies optical signals of wavelengths in the range of 1520 nm to 1580 nm when pumped by an optical pump signal of wavelength 980 nm or 1480 nm. It is to be understood that erbium doped fiber is just one, non-limiting example and that other dopants may be used as is known in the art.

FIG. 1 also illustrates a conventional pump laser 40 providing pumping light to the doped fiber 20 via a WDM (wavelength division multiplexer) 30. The WDM 30 is a conventional element that is also referred to as a wavelength selective coupler. WDM 30 may be constructed with various devices to permit the signal light and pumping light to pass transparently therethrough. The pump 40 emits light at a wavelength different than the signal light. The wavelength selective coupler or WDM 30 is frequency or wavelength selective in that it will route the pumping light onto doped fiber section 20 and prevent signal light from being fed to the pump 40. For example, WDM 30 may be a wavelength division multiplexer using a Bragg filter or Fabry-Perot interferometer. WDM 10 may also be made from, for example, dielectric coatings, a thin-film filter, or arrayed waveguides.

Pump lasers typically supply pumping light at 980 nm or 1480 nm for a erbium doped fiber amplifier. In the invention and where erbium doped fiber is used for doped fiber section 20, the pump laser 40 preferably outputs pumping light at 980 nm at a power level determined by the amount of drive current being supplied to the pump laser 40 by the pump drive circuit.

Input and output power measuring devices are used to measure the optical power of the signal being input/output to/from the amplifier. As shown in FIG. 1, such power measuring devices are preferably implemented with electronic circuits as are the other components of the invention. The input power measuring circuit includes a photodiode 150 that receives a portion (e.g. 2%) of the optical input signal via a coupler (not shown), tap, or equivalent. In general, any optoelectrical device such as the photodiode 150 shown may serve to convert the optical signal to an electrical signal. A gain set amplifier 160 which may be implemented with a variable transimpedance amplifier is connected to the output of the photodiode 150.

The output power measuring circuit includes a photodiode 180 that receives a portion (e.g. 2%) of the optical output signal and a transimpedance amplifier 190.

A TC (transient control) error amplifier 200 is connected to the outputs of the transimpedance amplifiers 160, 190 and finds the difference therebetween. The TC error amplifier 200 may be constructed with conventional components such as a differential amplifier. Of course, if the output of either transimpedance amplifier 160, 190 is an inverting output then a summing amplifier may be used as the TC error amplifier 200.

The optical output power of the pump laser 40 is also monitored by the invention in order to control the amplifier. The conventional pump laser 40 backfacet diode 60 (a.k.a. monitor diode) or a photodiode separate from the pump laser 40 may be used for this purpose. Experiments show that the backfacet photodiode 60 is accurate enough for the invention to operate properly and acts as a current source which is nearly proportional to the fiber-coupled power being supplied by the pump laser 40. A transimpedance amplifier 70 is connected to the photodiode 60 and converts the current to a voltage.

A CP (constant power) error amplifier 90 is connected to the transimpedance amplifier 70 and compares the voltage indicative of the pump laser power with a CP setting 80. The CP error amplifier 90 may be implemented with a differential amplifier or with a summing amplifier if, for example, the amplifier 70 has an inverted output.

A CC (constant current) error amplifier 140 is connected to a laser current monitor (not shown) in order to receive a current monitor signal (shown) representative of the electrical drive current being supplied to the pump laser 40. Current monitoring devices are quite conventional and include a wide variety of implementations. One example is a sense resistor in series with the laser diode 40 and a differential amplifier to scale and offset the sensed voltage drop across the resistor. The CC error amplifier 140 may be implemented with a differential amplifier or with a summing amplifier as outlined above.

Any of the signals supplied by CC error amplifier 140, CP error amplifier 90 or TC error amplifier 200 may be used to drive pump laser 40. Therefore, each of the error amplifiers 90, 140, 200 preferably utilizes conventional PID (Proportional-Integral-Derivative) control techniques and circuitry to provide a laser drive signal that minimizes the error. For example, the constant current error amplifier inputs a feedback signal (the current monitor signal) that is used to generate an error value (CC error) that is preferably minimized using PID techniques built into CC error amp 140. Preferably, only one of the signals from the error amps 90, 140, 200 is used to drive the pump laser at any one time.

Selector node 100 is connected to the CP error amplifier 90, the CC error amplifier 140 and the TC error amplifier 200. Selector node 100 increases its own output signal until limited by the lowest of CP limit, CC limit or TC limit. Selector node 100 has an enable drive signal 105 which is an artificially high input signal that is continuously fed to node 100. Without the CC, CP and TC limits, the selector node 100 would drive the pump laser 40 with the enable drive signal 105 to the limits of the module and quickly burn out the laser diode 40. The selector node 100 effectively reduces the enable drive signal 105 to a practical level by the lowest of CC, CP and TC limits.

Selector node 100 may be implemented with diodes using the so-called diode OR-ing technique. Diode OR-ring techniques and circuits, in and of themselves, are quite conventional and need not be discussed further herein. In short, whichever of the three input signals (enable drive signal, CC limit, CP limit or TC limit) is lower than the other will dominate by virtue of its diode conducting and cutting off the other input signals. Thus, the output of the selector node 100 is the lowest among the input signals (enable drive signal, CC limit, CP limit or TC limit).

It is to be noted that the limit signals (CC limit, CP limit or TC limit) are dynamic signals and not fixed values so that the selector node 100 dynamically selects the lowest input and outputs the selected signal for output from the selector 100. In most cases, the TC limit is the active or lowest signal and is output from the selector node 100. If the laser 40 reaches its current or power setpoints, as determined by the CC limit and CP limit, respectively then CP limit or CC limit will override the TC limit and become the lowest signal input to the selector node 100 and, thereby, the signal that drives the pump laser 40.

It is possible to dispense with the enable drive signal 105 entirely and rely upon the limit signals (TC limit, CP limit and CC limit) to drive the laser 40. More specifically, the enable drive signal may be omitted such that the selector node 100 selects the lowest of the TC limit, CP limit, and CC limit.

Operation

In general, the amplifier shown in FIG. 1 operates as follows: the optical input 10 is amplified in the doped fiber section 20, using optical pump power from the pump laser source 40, then sent to output 50.

More specifically and in terms of the inventive power control techniques, the pump laser 40 power is monitored by a photodiode 60 (e.g. either the internal backfacet or an external photodiode on a tap) and electrically amplified by the TIA 70 (TransImpedance Amplifier). The difference between that signal and the CP (Constant Power) setting 80 (AKA setpoint) is determined by the CP error amplifier 90 and output as a CP limit and supplied to the selector node 100. Selector node 100 selects the lowest signal among the enable drive signal 105 and the CP limit (and the CC and TC limits as further discussed below). The output of selector node 100 provides drive current for the pump laser 40. This closed loop maintains a maximum pump laser power through items 40, 60, 70, 90, and 100.

At the same time as pump power control, the invention also monitors pump current 120. The difference between the current monitoring signal and the CC (Constant Current) setting 130 is determined by the CC error amplifier 140. Selector node 100 selects the lowest signal among the enable drive signal 105, the CP limit, and the CC limit (and the TC limit as further discussed above and below). The output of selector node 100 provides drive current for the pump laser 40. This closed loop maintains a maximum pump laser current through items 40, 120, 140, and 100.

A tap of the input 10 is sent to a photodiode 150 to measure the input optical power. The electrical output of photodiode 150 is amplified by gain set amplifier 160, the gain of which is controlled by the TC setting. The TC setting 170 controls the optical gain of the amplifier from input 10 to output 50.

A tap of the output 50 is sent to a photodiode 180 to measure the optical output power. The electrical output of photodiode 180 is amplified by a TIA 190 and converted to a voltage. The difference between the outputs of the gain set amplifier 160 and TIA 190 is determined by TC error amplifier 200 and output as a TC limit. Selector node 100 selects the lowest among the input signals (enable drive signal, CC limit, CP limit or TC limit). The output of selector node 100 provides drive current for the pump laser 110. This closed loop maintains a maximum optical gain through items 150, 160, 200, 100, 40, 30, 20, 180, 190 and back to 200.

Note that for testing and calibration purposes, the TC error amplifier 200 can be turned on or off by TC enable 210. This is necessary if there is no or little optical input signal 10 but the pump laser 40 is to be turned on.

The selector node 100 constantly tries to increase its output and therefore laser drive and power. It is limited by the lowest of CP limit, CC limit or TC limit. To disable the laser, CC limit and/or CP limit may be set to zero.

The inventive amplifier control apparatus may operate in either a Constant Current ("CC") mode, a Constant Power ("CP") mode or a Transient Control ("TC") mode. The laser current/drive is always the lowest required of these three and selector node 100 output is limited by the lower of the CP limit, CC limit or TC limit. That being said, there is no setting of modes, no laser enabling, just these three modes of operation. To shut off the laser, the CP setting and/or CC setting are set to zero (the TC setting should not be used since it is unreliable for shutting off a laser due to the unknown input power). Conversely, for pump laser 40 to operate, it must have both CP setting and CC setting that are both above zero. For example, to explicitly put pump laser 40 into a CC mode, set the power (CP setting) high, disable TC and/or set it high and then set the CC setting to the desired current. The current setting will be the lowest of the three so the laser will be in CC mode.

Typically, the CC setting is set to the pump laser 40 diode's EOL (End of Life) value and the current required for any pump power typically increases over time to account for laser aging in which higher and higher driver currents are necessary to produce the same pump laser optical power and EDFA gain as the pump laser 40 ages. The EOL value may be a percentage above the BOL (beginning of life) pump drive current and is conveniently set at the factory. It is generally preferred that the CC setting act as an upper limit to the drive current and the TC control will generally dominate. The CP setting generally acts to prevent drive currents that would result in operating the pump laser 40 over its rated power level.

The CC control mode is typically used in the factory for calibrating a new pump laser 40 and in normal operation to limit the laser current under abnormal conditions.

The main and preferred operational mode is the TC mode in which the TC circuit maintains a constant gain between amplifier input and output power. For normal TC operation, set the laser current (CC setting) to End Of Life ("EOL") laser current, set the power (CP setting) to rated power and set and enable the TC setting. The pump laser 40 will maintain the set EDFA gain set by the TC setting but cannot exceed EOL current or rated power.

The TC control circuit works by comparing the amp input power to the amp output power with result as signed power error. In one implementation, the input power is inverted and multiplied by a controlled scalar (TC setting) and the resulting inverted signal is summed with the output power. The two should null. Alternatively, the input power may not be inverted, in which case the difference between the scaled input and the output should be zero. Any error is sent to the pump laser(s) 40 as a change in laser current.

Figure 7:
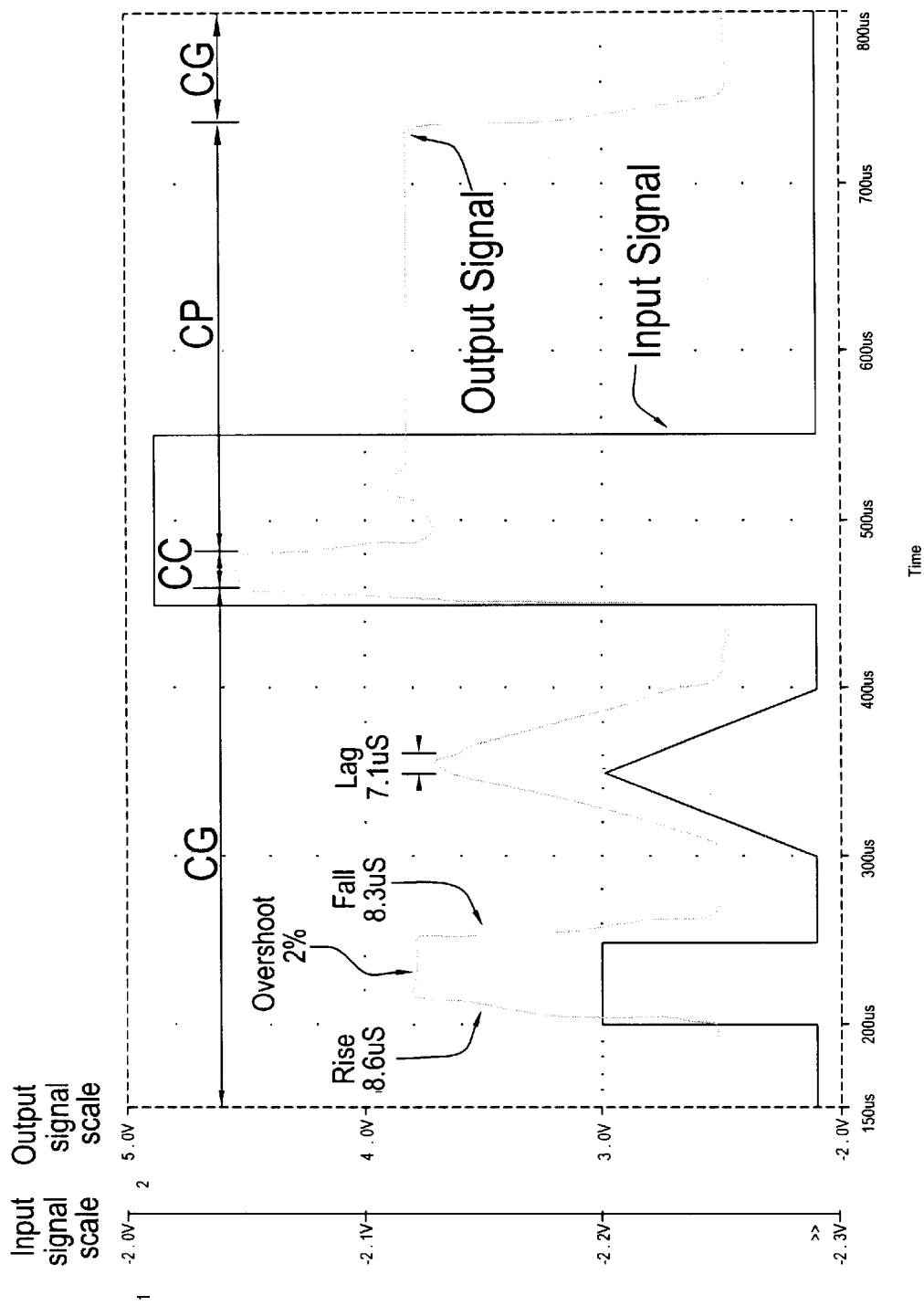
FIG. 7 is a graph showing optical amplifier optical input and output signals as a function of time and illustrating the interplay between CC, CP and CG (constant gain) control functions performed by the invention on a single pump laser.

More specifically, the optical amplifier transient control circuit compares the measured optical output power to the expected optical output power, based on the measured optical input power, with the result being a power error. This results in an instantaneous power error that is used to drive the pump laser(s). The algorithm is continuous and works down to zero optical input power with the only upper limit being the limitation of the optical and electronic devices used in the implementation. The result is a fast, simple algorithm with no discontinuities or non-linearities, easily implemented in analog hardware. FIG. 7 is a graph showing simulated optical amplifier optical input and output signals as a function of time and illustrating the interplay between CC, CP and CG control functions performed by the invention on a single pump laser. The simulation results shown in FIG. 7 utilize certain assumptions about the time delays through each stage of the amplifier but are otherwise representative of the invention.

FIG. 7 shows the input signal Y-axis offset from the output signal Y-axis for clarity. Using the X-axis time scale for reference, between 150 $\mu$S and 450 $\mu$S the transient control circuit tracks the changing optical input signal with a slight delay. At 450 $\mu$S, the input signal suddenly increases well beyond the capabilities of the pump laser 40. To protect the pump laser 40 from damage by exceeding its maximum laser diode forward current, the CC circuit overrides the transient current limit and limits the current. In this example, the CP circuit is slightly slower than the CC circuit although in practice their relative speeds can vary either way. At 475 µS, the CP circuit has detected and responded to the pump laser's excessive optical power output. Although for 25 µS the pump laser 40 had excessive power, this was acceptable because of the current limiting and will not affect the laser's reliability.

Between 475 µS and 530 µS, the CP circuit reduces the pump laser drive so that it maintains the maximum allowable power. At 550 µS, the excessive input signal is removed. Between 550 µS and 730 µS, both the doped fiber segment 20 inversion population is depleted and the TC circuit recovers while the pump laser 40 is power limited. Between 730 µS and 760 µS, the TC circuit becomes active and establishes a stable gain by 760 µS.

Not shown in FIG. 7 is the long-term interaction of CC limit and CP limit. As the pump laser 40 ages and requires more laser diode forward current to obtain the same pump power, it may eventually reach its maximum current. At that time the CC circuit will override TC circuit to protect what remaining pump power is available from the pump laser 40 without having it fail suddenly and totally, leaving enough time to safely replace the assembly or module with the pump laser 40.

Figure 2:
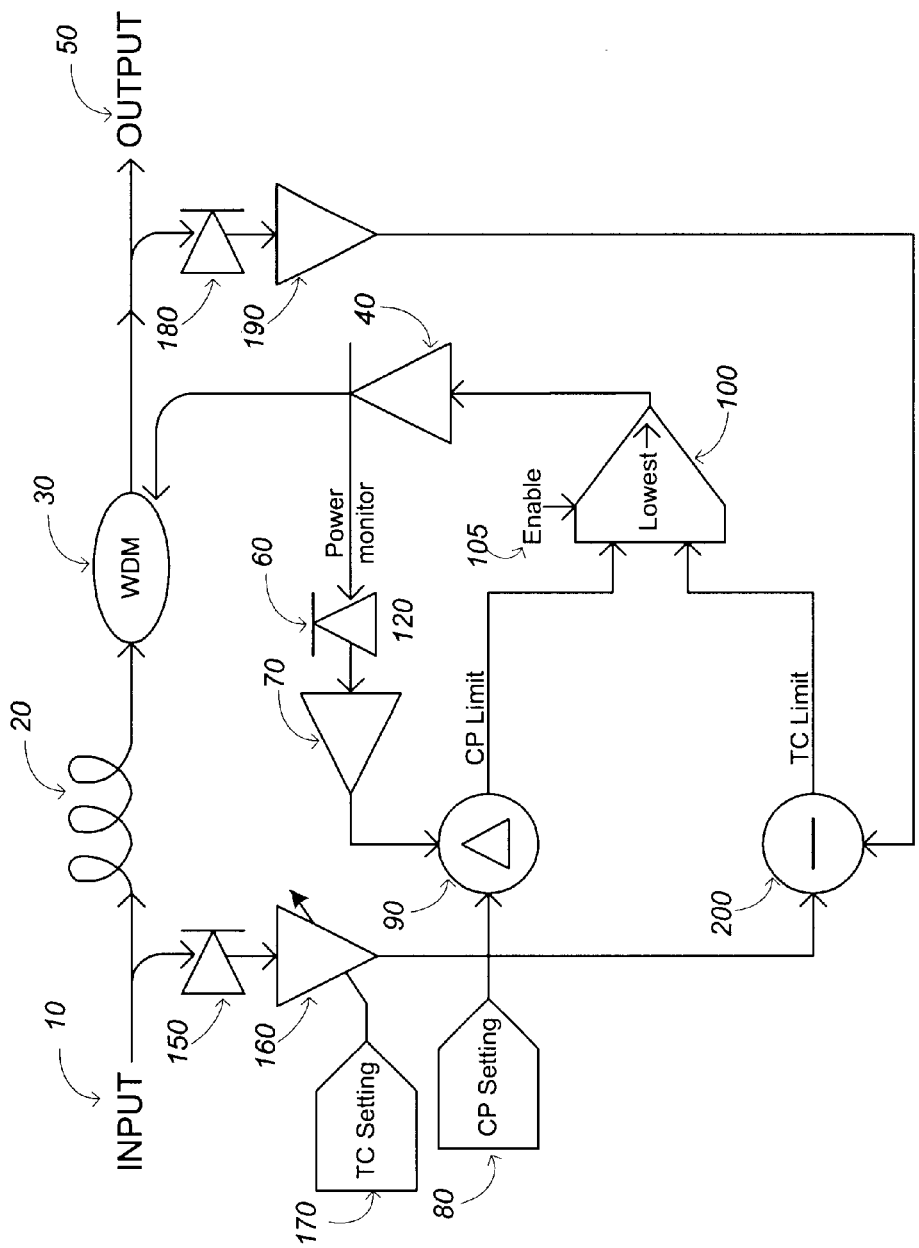
FIG. 2 is a high level block diagram illustrating an amplifier control apparatus implementing transient control and constant power control circuits according to another embodiment of the invention.

FIG. 2 illustrates another embodiment of the invention. Many of the components and functions of the FIG. 2 embodiment are identical or similar to the FIG. 1 embodiment with like references numbers indicating like parts and functions. The amplifier control apparatus shown in FIG. 2 implements transient control and constant power control according to the descriptions above but not the constant current control of the FIG. 1 embodiment. Thus, the selector node 100 will increase its output and therefore the laser drive power until limited by the lower of the CP limit or the TC limit.

The full combination of TC, CC and CP circuits as in the FIG. 1 embodiment is preferred over the embodiment that combines the TC circuit and CP circuit as shown in FIG. 2. The reason is that in the FIG. 2 embodiment it is possible to exceed absolute maximum current drive of pump laser 40 under large transient conditions and possibly damage or degrade the laser. Furthermore, it is much more difficult to determine when the laser is showing aging effects and nearing its end of life and such that preventative maintenance can be performed.

Figure 3:
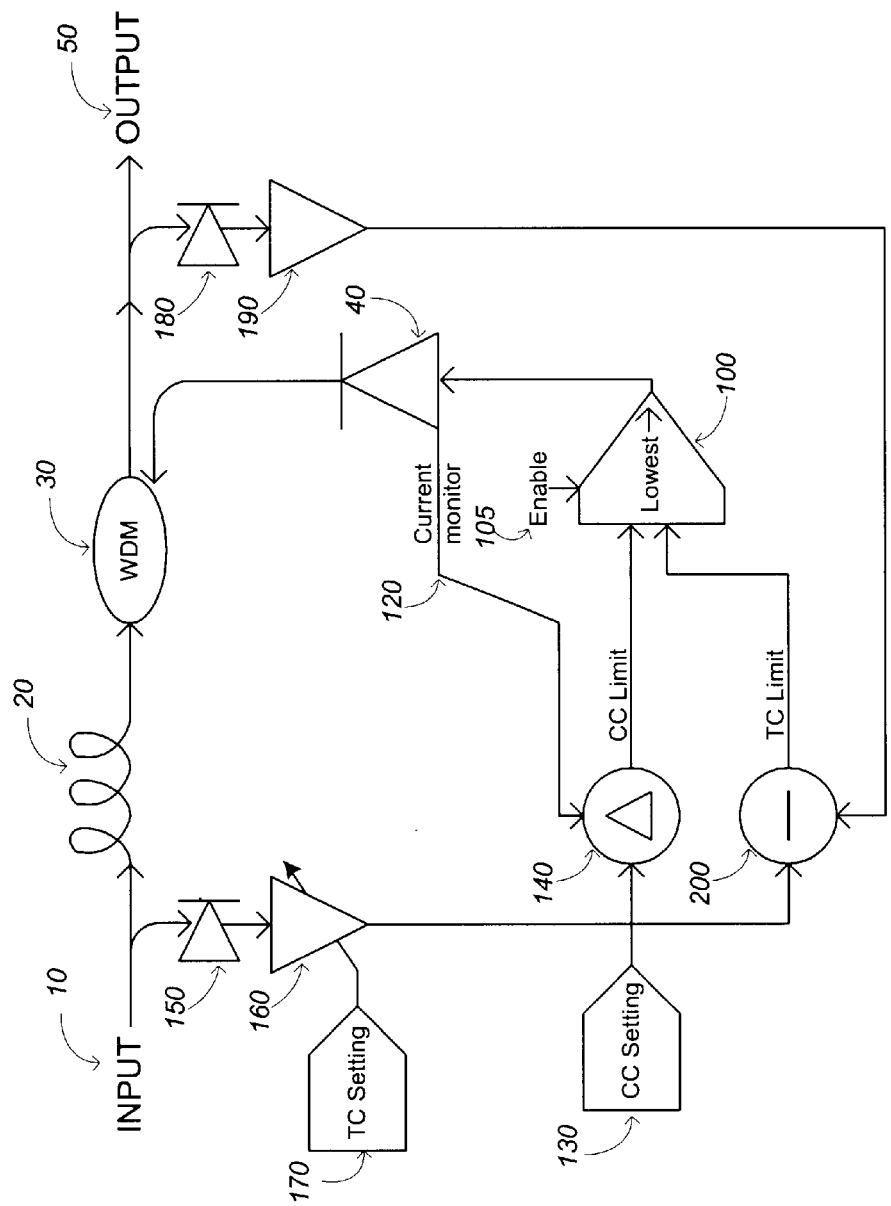
FIG. 3 is a high level block diagram illustrating an amplifier control apparatus implementing transient control and constant current control circuits according to another embodiment of the invention.

FIG. 3 illustrates another embodiment of the invention. Many of the components and functions of the FIG. 3 embodiment are identical or similar to the FIG. 1 embodiment with like references numbers indicating like parts and functions. The amplifier control apparatus shown in FIG. 3 implements transient control and constant current control according to the descriptions above but not the constant power control of the FIG. 1 embodiment. Thus, the selector node 100 will increase its output and therefore the laser drive power until limited by the lower of the CC limit or the TC limit.

The full combination of TC, CC and CP circuits as in the FIG. 1 embodiment is preferred over the embodiment that combines the TC circuit and CC circuit as shown in FIG. 3. The reason is that in the FIG. 3 embodiment the pump laser 40 may be damaged or degraded by large transients because some lasers may generate lots of power with little current. However, the FIG. 3 embodiment is generally considered a safer alternative than the FIG. 2 embodiment because excess current can ruin a laser faster than excess power.

Figure 4:
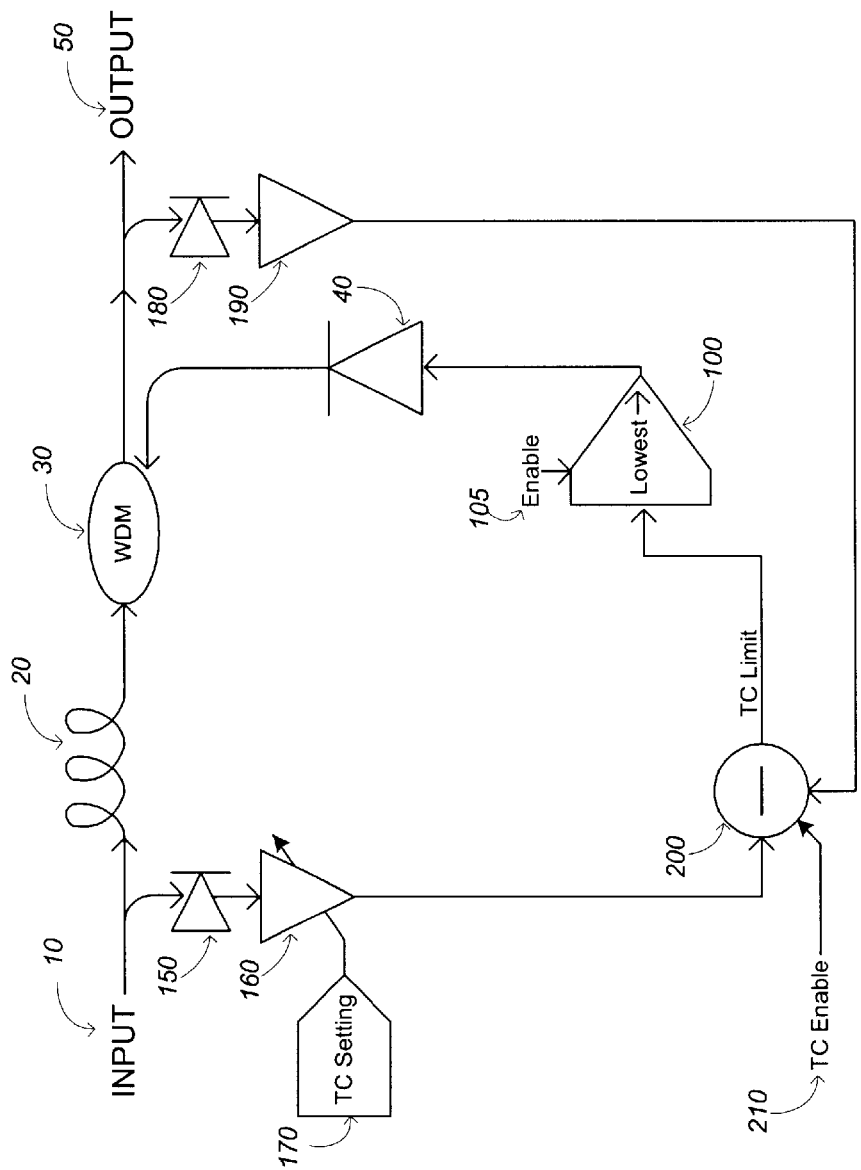
FIG. 4 is a high level block diagram illustrating an amplifier control apparatus implementing transient control according to yet another embodiment of the invention.

FIG. 4 illustrates still another embodiment of the invention. Many of the components and functions of the FIG. 4 embodiment are identical or similar to the FIG. 1 embodiment with like references numbers indicating like parts and functions. The amplifier control apparatus shown in FIG. 4 implements transient control according to the descriptions above but not the constant current or constant power control of the FIG. 1 embodiment. Thus, the selector node 100 will increase its output and therefore the laser drive power until limited by the TC limit. Alternatively, the selector node 100 may be eliminated entirely in the FIG. 4 embodiment with the TC error amp 200 driving the pump laser 40 directly.

The invention is not limited to the specific circuits shown in FIGS. 1–4 and described above in detail. One of the inventive concepts is to avoid the division-by-zero problem of using the conventional amp control equation (based on Pout/Pin). To that end, the invention applies a different control equation (based on (Pin*Gset)-Pout). For the purposes of the invention control equation variations such as a) Pout-(Pin*Gset) and b) (Pout*Gset/Gk)-Pin, where Gk is a constant larger than Gset so as to allow a simple gain stage are considered full equivalents to (Pin*Gset)-Pout.

In general, a central component of the invention is a transient control circuit that embodies the control equation stated above. The CC and CP circuits add quite useful and advantageous laser protection mechanisms that enhance the TC circuitry.

Figure 5:
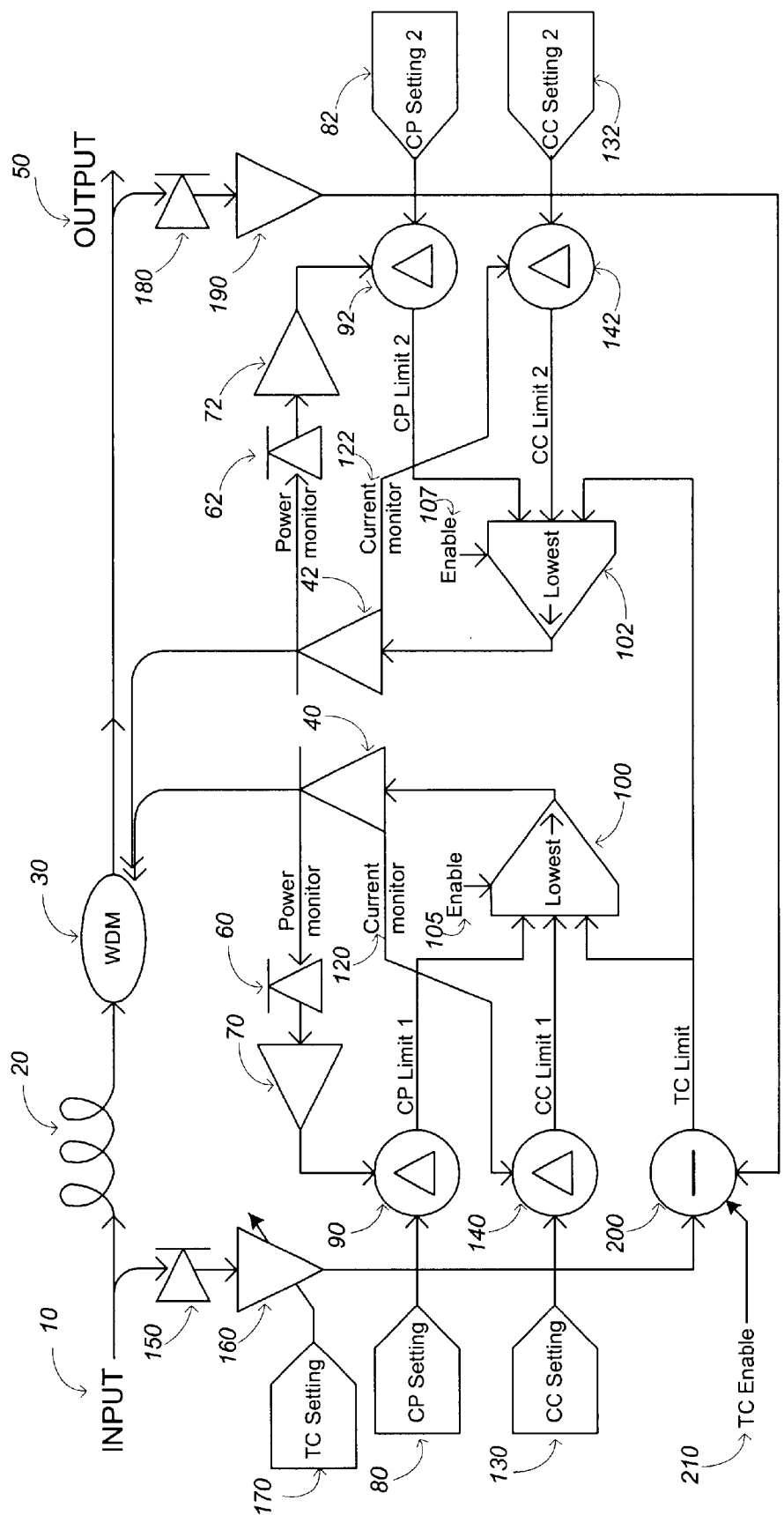
FIG. 5 is a high level block diagram illustrating an amplifier control apparatus having multiple pump lasers and implementing transient control, constant power control and constant current control circuits according to an embodiment of the invention.

FIG. 5 illustrates a variation of the invention in which a second pump laser 42 is included, for redundancy or increased pump power or other reasons. The second pump laser 42 is controlled in a similar manner to the first pump laser 40 including the transient control, constant power and constant current control techniques and associated circuits.

More specifically, the constant power circuit for the second pump laser 42 includes a power monitoring device which may be implemented with a photodiode 62 (e.g. either the internal backfacet or an external photodiode on a tap) and electrically amplified by the TIA 72 (TransImpedance Amplifier). The difference between that signal and the CP (Constant Power) setting 82 is determined by the CP error amplifier 92 and output as a CP limit 2. Selector node 100 selects the lowest among the input signals (CC limit 2, CP limit 2 or TC limit). The output of selector node 102 provides drive current for the pump laser 42. This closed loop maintains a maximum pump laser power through items 42, 62, 72, 92, and 102.

In addition, the constant current circuit for the redundant pump laser 42 includes the pump current monitor 122. The difference between that the current monitor signal and the CC (Constant Current) setting 132 is determined by the CC error amplifier 142 and output as CC limit 2. Selector node 102 increases its own input signal until limited by the CC error amplifier 142. Selector node 100 selects the lowest among the input signals (CC limit 2, CP limit 2 or TC limit). The output of selector node 100 provides drive current for the pump laser 42. This closed loop maintains a maximum pump laser 40 current through items 42, 122, 142, and 102.

The TC circuit for the second pump laser 42 utilizes the same TC limit as the first pump laser 40. Indeed, the input and output powers that are monitored to derive the TC limit are the same for the second pump laser 42 as for the first pump laser 40 and should have the same TC limit unlike the CC and CP limits which must differ since they are derived from different lasers. Selector node 100 selects the lowest among the input signals (CC limit 2, CP limit 2 or TC limit). In other words, the selector node 102 will increase its output and therefore the laser drive current until limited by the lower of the CP limit 2, the CC limit 2 or the TC limit.

Different CC and CP limit values are generally preferred because lasers vary greatly from unit to unit with some minor specifications varying by 20:1 between two lasers. EOL currents for any model of laser can vary up to a 2:1 ratio from unit to unit. The CC limit is the calibrated current limit for that particular unit—if the laser is replaced then CC limit should be recalibrated. As for CP limit, it is generally preferred that the laser power monitor is first calibrated to a generic level and CP limit is the same for all units of any mode.

The concept of a multiple pump lasers per stage may be expanded to include more than two pump lasers 40, 42. Although the laser driver circuitry, CC circuit and CP circuit would be duplicated for each such additional laser, the transient control ("TC") circuit does not have to know how many lasers are operating. All but one of the pump lasers 40, 42, etc can fail or be shut off and the amplifier will still function normally.

Furthermore, multiple pump lasers may operate in several modes including a backup mode and a redundant mode. In the backup mode, one laser is set normally (CC setting and CP setting) while the backup laser's current setpoint (CC setting 2) is set to zero. Upon failure of the main laser 40, a new current setpoint value (CC setting 2) may be utilized and it will become active. In the redundant mode, both lasers 40, 42 are always running but if one fails then the other takes over in a nearly seamless manner. A trigger that may be used to switch to backup mode comes from transient error amplifier 200 not being able to maintain the gain and CP error amplifier 90 is not limiting laser power.

FIGS. 1–5 show a single stage optical amplifier. It is generally preferred, however, that the optical amplifier have more than one stage. This may be accomplished by utilizing one of the amplifier control circuits of FIGS. 1–5 for each stage such that each control circuit independently controls a corresponding one of the stages. The FIG. 5 embodiment is the most preferred single stage amplifier control circuit and the design thereof may be used to advantage for other stages by duplicating the circuit elements for each stage.

Figure 6:
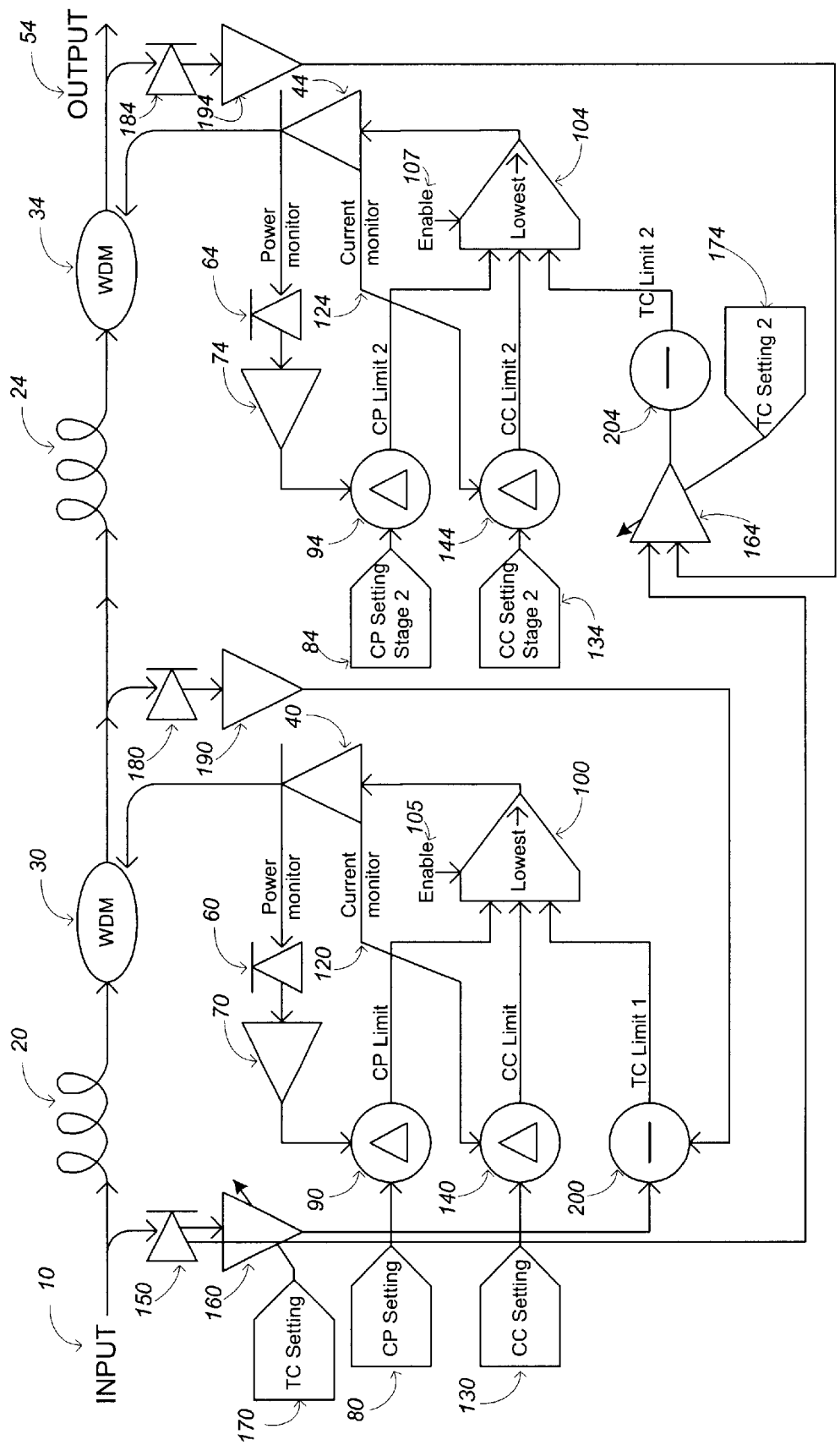
FIG. 6 is a high level block diagram illustrating an amplifier control apparatus for a two-stage amplifier implementing transient control (TC), constant power (CP) control and constant current (CC) control circuits according to an embodiment of the invention.

Instead of repeating the amplifier control circuit and utilizing independent control for each stage of the optical amplifier, a cascade arrangement may be utilized. FIG. 6 illustrates a two stage optical amplifier according to another embodiment of the invention that utilizes a cascaded control structure in which the input power measurement at the input of stage I is fed into the TC error amplifier 204 of the second stage. The TC error amp 204 also receives the output power measurement of stage 2.

The TC error amplifier 204 for the second stage is structurally similar to the TC error amplifier 200 for the first stage. The main difference between the two TC error amps is the input. The second stage TC error amplifier 204 receives the input power measurement from the input to the first stage (after being amplified by the second stage gain set amplifier 164). The second stage gain set amplifier 164 amplifies the first stage input power by the second stage TC setting 2 to compute the total expected output power of the first and second stages taken together. Thus, the TC error amplifier 204 compares expected total output power with an output power measurement from the output of the second stage (via photodiode 184 and transimpedance amplifier 194). Thus, the TC circuit for the second stage pump laser 44 outputs TC limit 2 for the second stage pump laser 44. This is a result of the cascaded structure and feed forward of the first stage input power measurement to the second stage TC error amplifier 204 via the second stage gain set amplifier 164.

As further shown in FIG. 6, a constant power circuit for the second stage pump laser 44 includes a power monitoring device which may be implemented with a photodiode 64 (e.g. either the internal backfacet or an external photodiode on a tap) and electrically amplified by the TIA 74 (TransImpedance Amplifier). The difference between that signal and the CP (Constant Power) setting 84 is determined by the CP error amplifier 94 and output as a CP limit 2. Selector node 104 selects the lowest among the input signals (CC limit 2, CP limit 2 or TC limit 2). The output of selector node 104 provides drive current for the pump laser 44. The pump laser 44 feeds pump light into the second segment of doped fiber 24 via WDM 34. This closed loop maintains a maximum pump laser power for the second stage through items 44, 64, 74, 94, and 104.

In addition, the constant current circuit for the second stage pump laser 44 includes the pump current monitor 124. The difference between that signal and the CC (Constant Current) setting 134 is determined by the CC error amplifier 144. Selector node 104 selects the lowest among the input signals (CC limit 2, CP limit 2 or TC limit 2). The output of selector node 104 provides drive current for the pump laser 44 of the second stage. This closed loop maintains a maximum pump laser 44 current through items 44, 124, 144, and 104.

The selector node 104 of the second stage will increase its output and therefore the laser drive power until limited by the lower of the CP limit 2, the CC limit 2 or the TC limit 2.

This cascading concept may be extended to three or more stages such that the input power measurement from the input to the first stage is fed forward to subsequent stages. Each such subsequent stage would preferably include a gain set amplifier receiving the first stage input power measurement and amplifying the first stage input power measurement by a TC setting for that stage.

Another variation of the invention is to combine the FIG. 5 and FIG. 6 embodiments in which the cascaded control structure of FIG. 6 is enhanced by the multiple pump laser structure of FIG. 5 such that each stage has multiple pumps and the stages are nested or cascaded as in the FIG. 6 structure. The result is a multi-stage optical amplifier having multiple pumps per stage and a cascaded control structure from stage to stage. If three or more stages are cascaded in this fashion the last stage preferably uses the input power measurement from the first stage and each intermediate stage uses its own output power measurement and either its own or any previous stage's input power measurement.

Optical amplifiers having multiple stages, whether physically close to each other or separated by long spans of fiber, may benefit from a variable response speed. In other words, it is generally preferably to use a variable response speed for cascaded amplifier designs such as the one shown in FIG. 6. Imperfections in the gain or control of an upstream stage will be passed down the chain and each subsequent stage may exacerbate the error until the error dominates over the useful signal being transmitted. By slowing down the TC response time, timing-dependant errors such as overshoot and undershoot may be reduced at the cost of short-term accuracy. Thus, it is preferable to use a variable response speed for TC error amplifiers 200, 204, etc and/or the selector node 100, 102, 104, etc.

The magnitude of the variable response speed preferably has an inverse relation to the magnitude of the error. If each stage in a cascaded system uses a variable response speed, then a small transient entering the first stage will be passed through virtually unaffected in the short term but will be gradually limited by subsequent downstream stages as the transient amplitude error increases through the stages.

Variable response speed in the TC error amps 200, 204, etc and/or the selector nodes 100, 102, 104, etc is not to be confused with PID control discussed above in relation to the amps 90, 140 and 200. Essentially, variable response speed changes the time dependence of the PID gains. In a specific implementation, the TC error amps 200 and 204 utilize a variable response speed in which the response time varies in an inverse relation to magnitudes of the respective transient control error value and second transient control error value.

In conclusion, the transient control circuit maintains the same gain as the input power of the optical amplifier changes. Input power and gain changes are typically very fast, in the 10's to 100's of $\mu$S range per optical amplifier. The transient control implemented by the invention varies the pump laser(s) power, which adjusts the total optical amp output power. Analog circuitry is generally preferred because it is not only well suited to amplifier and pump laser control but is also much simpler and typically faster than digital control.

Digital settings such as the TC setting, CP setting, and CC settings may be commanded by software embedded in a digital controller associated with the optical amplifier, node or system to which the amp is connected. The embedded software may monitor and adjust these settings as necessary with the analog circuitry being responsible for actually adjusting the pump laser(s) power.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An optical amplifier control apparatus for controlling an optical amplifier having at least one stage with a fiber segment doped with an optically active material and at least one pump laser, comprising:

an input optical power monitoring circuit operatively connected to an input of the optical amplifier, said input optical power monitoring circuit converting light at the input of the optical amplifier into an input power measurement representative of the optical power input to the optical amplifier;

an output optical power monitoring circuit operatively connected to an output of the optical amplifier, said output optical power monitoring circuit converting light at an output of the optical amplifier into an output power measurement representative of the optical power output from the at least one stage of the optical amplifier;

a gain set amplifier operatively connected to said input optical power monitoring circuit, said gain set amplifier amplifying the input power measurement by a gain setting to generate a desired output power value;

a transient control error amplifier operatively connected to said gain set amplifier and to said output optical power monitoring circuit, said transient control error amplifier generating a transient control error value according to a difference between the desired output power value generated by said gain set amplifier and the output power measurement;

a pump laser current monitor generating a pump current monitoring signal representative of a pump current being supplied to the pump laser;

a constant current error amplifier operatively connected to said pump laser current monitor, said constant current error amplifier finding a difference between the pump current monitoring signal and a constant current setting to generate a constant current limit;

a pump laser power monitor generating a pump power monitoring signal representative of pump power output by the pump laser;

a constant power error amplifier operatively connected to said pump laser power monitor, said constant power error amplifier finding a difference between the pump power monitoring signal and a constant power setting to generate a constant power limit; and a selector node operatively connected to said transient control error amplifier, said constant power error amplifier and said constant current error amplifier, said selector node selecting a lowest signal between the transient control error value, the constant current limit, and the constant power limit and supplying the lowest signal as a drive signal to the pump laser.

2. The optical amplifier control apparatus according to claim 1, said gain set amplifier including a variable transimpedance amplifier converting a current from said input optical power monitoring circuit representative of the input power measurement to an amplified voltage amplified by the gain setting and representative of the desired output power value; and said output optical power monitoring circuit including an optoelectrical device receiving a portion of the light being output from the optical amplifier and a transimpedance amplifier converting a current from the photodiode into a voltage representative of the optical power output from the at least one stage of the optical amplifier.

3. The optical amplifier control apparatus according to claim 1, said output optical power monitoring circuit including an optoelectrical device receiving a portion of the light being output from the optical amplifier; and said input optical power monitoring circuit including a second optoelectrical device receiving a portion of the light being input to the optical amplifier.

4. The optical amplifier control apparatus according to claim 1, wherein the optical amplifier includes at least two stages each having a fiber segment doped with an optically active material and at least one pump laser per stage, the optical amplifier control apparatus further comprising:

a second gain set amplifier operatively connected to said input optical power monitoring circuit, said second gain set amplifier amplifying the input power measurement by a second gain setting to generate a second desired output power value;

a second output optical power monitoring circuit operatively connected to an output of the second stage of the optical amplifier, said second output optical power monitoring circuit converting light at an output of the second stage of the optical amplifier into a second output power measurement representative of the optical power output from the second stage of the optical amplifier;

a second transient control error amplifier operatively connected to said second gain set amplifier and to said second output optical power monitoring circuit, said second transient control error amplifier generating a second transient control error value based on a difference between the second desired output power value generated by said second gain set amplifier and the second output power measurement;

a second pump laser current monitor generating a second pump current monitoring signal representative of a pump current being supplied to the pump laser pumping the second stage of the optical amplifier;

a second constant current error amplifier operatively connected to said second pump laser current monitor, said second constant current error amplifier finding a difference between the second pump current monitoring signal and a second constant current setting to generate a second constant current limit;

a second pump laser power monitor generating a second pump power monitoring signal representative of pump power output by the pump laser pumping the second stage of the optical amplifier;

a second constant power error amplifier operatively connected to said second pump laser power monitor, said second constant power error amplifier finding a difference between the second pump power monitoring signal and a second constant power setting to generate a second constant power limit; and a second selector node operatively connected to said second transient control error amplifier, said second constant power error amplifier and said second constant current error amplifier, said second selector node selecting a lowest signal between the second transient control error value, the second constant current limit, and the second constant power limit and supplying the lowest signal as a drive signal to the pump laser pumping the second stage of the optical amplifier.

5. The optical amplifier control apparatus according to claim 4, said transient control error amplifier and said second transient control error amplifier having a variable response speed, wherein the variable response speed varies in an inverse relation to magnitudes of the respective transient control error value and second transient control error value.

6. The optical amplifier control apparatus according to claim 4, said gain set amplifier and said second gain set amplifier having a variable response speed, wherein the variable response speed varies in an inverse relation to magnitudes of the transient control error value and second transient control error value, respectively.

7. The optical amplifier control apparatus according to claim 1, wherein the optical amplifier includes a first pump laser and a second pump laser pumping the at least one stage, the optical amplifier control apparatus further comprising:

a second pump laser current monitor generating a second pump current monitoring signal representative of a pump current being supplied to the pump laser pumping the at least one stage of the optical amplifier;

a second constant current error amplifier operatively connected to said second pump laser current monitor, said second constant current error amplifier finding a difference between the second pump current monitoring signal and a second constant current setting to generate a second constant current limit;

a second pump laser power monitor generating a second pump power monitoring signal representative of pump power output by the pump laser pumping the at least one stage of the optical amplifier;

a second constant power error amplifier operatively connected to said second pump laser power monitor, said second constant power error amplifier finding a difference between the second pump power monitoring signal and a second constant power setting to generate a second constant power limit; and a second selector node operatively connected to said transient control error amplifier, said second constant power error amplifier and said second constant current error amplifier, said second selector node selecting a lowest signal between the transient control error value, the second constant current limit, and the second constant power limit and supplying the lowest signal as a drive signal to the second pump laser pumping the at least one stage of the optical amplifier.

8. An optical amplifier control apparatus for controlling an optical amplifier having at least one stage with a fiber segment doped with an optically active material and at least one pump laser, comprising:

an input optical power monitoring circuit operatively connected to an input of the optical amplifier, said input optical power monitoring circuit converting light at an input of the optical amplifier into an input power measurement representative of the optical power input to the optical amplifier;

an output optical power monitoring circuit operatively connected to an output of the optical amplifier, said output optical power monitoring circuit converting light at an output of the optical amplifier into an output power measurement representative of the optical power output from the at least one stage of the optical amplifier;

a gain set amplifier operatively connected to said input optical power monitoring circuit, said gain set amplifier amplifying the input power measurement by a gain setting to generate a desired output power value;

a transient control error amplifier operatively connected to said gain set amplifier and to said output optical power monitoring circuit, said transient control error amplifier generating a transient control error value based on a difference between the desired output power value generated by said gain set amplifier and the output power measurement; and a selector node operatively connected to said transient control error amplifier, said selector node increasing an output thereof to a value limited by the transient control error value.

9. The optical amplifier control apparatus according to claim 8, said gain set amplifier including a variable transimpedance amplifier converting a current from said input optical power monitoring circuit representative of the input power measurement to an amplified voltage amplified by the gain setting and representative of the desired output power value; and said output optical power monitoring circuit including an optoelectrical device receiving a portion of the light being output from the optical amplifier and a transimpedance amplifier converting a current from the photodiode into a voltage representative of the optical power output from the at least one stage of the optical amplifier.

10. The optical amplifier control apparatus according to claim 8, said output optical power monitoring circuit including an optoelectrical device receiving a portion of the light being output from the optical amplifier; and said input optical power monitoring circuit including a second optoelectrical device receiving a portion of the light being input to the optical amplifier.

11. The optical amplifier control apparatus according to claim 8, further comprising:

a pump laser current monitor generating a pump current monitoring signal representative of a pump current being supplied to the pump laser; and a constant current error amplifier operatively connected to said pump laser current monitor, said constant current error amplifier finding a difference between the pump current monitoring signal and a constant current setting to generate a constant current limit;

said selector node increasing an output thereof to a value limited by the transient control error value or the constant current limit, whichever is less.

12. The optical amplifier control apparatus according to claim 8, further comprising:

a pump laser power monitor generating a pump power monitoring signal representative of pump power output by the pump laser; and a constant power error amplifier operatively connected to said pump laser power monitor, said constant power error amplifier finding a difference between the pump power monitoring signal and a constant power setting to generate a constant power limit;

said selector node increasing an output thereof to a value limited by the transient control error value or the constant power limit, whichever is less.

13. The optical amplifier control apparatus according to claim 8, further comprising:

a pump laser current monitor generating a pump current monitoring signal representative of a pump current being supplied to the pump laser;

a constant current error amplifier operatively connected to said pump laser current monitor, said constant current error amplifier finding a difference between the pump current monitoring signal and a constant current setting to generate a constant current limit;

a pump laser power monitor generating a pump power monitoring signal representative of pump power output by the pump laser; and a constant power error amplifier operatively connected to said pump laser power monitor, said constant power error amplifier finding a difference between the pump power monitoring signal and a constant power setting to generate a constant power limit;

said selector node increasing an output thereof to a value limited by the transient control error value, the constant current limit, or the constant power limit whichever is less.

14. The optical amplifier control apparatus according to claim 8, wherein the optical amplifier includes at least two stages each having at least one fiber segment doped with an optically active material and at least one pump laser per stage, the optical amplifier control apparatus further comprising:

a second gain set amplifier operatively connected to said input optical power monitoring circuit, said gain set amplifier amplifying the input power measurement by a second gain setting to generate a second desired output power value;

a second output optical power monitoring circuit operatively connected to an output of the second stage of the optical amplifier, said second output optical power monitoring circuit converting light at an output of the second stage of the optical amplifier into a second output power measurement representative of the optical power output from the second stage of the optical amplifier;

a second transient control error amplifier operatively connected to said second gain set amplifier and to said second output optical power monitoring circuit, said second transient control error amplifier generating a second transient control error value based on a difference between the second desired output power value generated by said second gain set amplifier and the second output power measurement;

a second selector node operatively connected to said second transient control error amplifier, said second selector node increasing an output thereof to a value limited by the second transient control error value, wherein the output of said second selector node is supplied to the at least one pump laser pumping the second stage of the optical amplifier.

15. The optical amplifier control apparatus according to claim 8, wherein the optical amplifier includes a first pump laser and a second pump laser pumping the at least one stage, the optical amplifier control apparatus further comprising:

a second selector node operatively connected to said transient control error amplifier, said second selector node increasing an output thereof to a value limited by the transient control error value, wherein the output of said second selector node is supplied to the second pump laser, and wherein the output of said selector node is supplied to the first pump laser.

16. The optical amplifier control apparatus according to claim 15, further comprising:

a first pump laser current monitor generating a first pump current monitoring signal representative of a pump current being supplied to the first pump laser;

a first constant current error amplifier operatively connected to said first pump laser current monitor, said first constant current error amplifier finding a difference between the first pump current monitoring signal and a first constant current setting to generate a first constant current limit;

a first pump laser power monitor generating a first pump power monitoring signal representative of pump power output by the first pump laser; and a first constant power error amplifier operatively connected to said first pump laser power monitor, said first constant power error amplifier finding a difference between the first pump power monitoring signal and a first constant power setting to generate a first constant power limit;

said selector node increasing an output thereof to a value limited by the transient control error value, the first constant current limit, or the first constant power limit, whichever is less;

a second pump laser current monitor generating a second pump current monitoring signal representative of a pump current being supplied to the second pump laser;

a second constant current error amplifier operatively connected to said second pump laser current monitor, said second constant current error amplifier finding a difference between the second pump current monitoring signal and a second constant current setting to generate a second constant current limit;

a second pump laser power monitor generating a second pump power monitoring signal representative of pump power output by the second pump laser;

a second constant power error amplifier operatively connected to said second pump laser power monitor, said second constant power error amplifier finding a difference between the second pump power monitoring signal and a first constant power setting to generate a second constant power limit; and a second selector node operatively connected to said transient control error amplifier, said second selector node increasing an output thereof to a value limited by the transient control error value, the second constant current limit, or the second constant power limit, whichever is less.

17. The optical amplifier control apparatus according to claim 8, wherein the optically active material is erbium and the optical amplifier is an erbium doped fiber amplifier.

18. The optical amplifier control apparatus according to claim 8, said selector node receiving an enabling drive signal and increasing an output thereof to a value limited by the transient control error value or the enabling drive voltage, whichever is less.

19. An optical amplifier control apparatus for controlling an optical amplifier having at least a one stage with a fiber segment doped with an optically active material and at least one pump laser, comprising:

an input optical power monitoring circuit operatively connected to an input of the optical amplifier, said input optical power monitoring circuit converting light at an input of the optical amplifier into an input power measurement, Pin, representative of the optical power input to the optical amplifier;

an output optical power monitoring circuit operatively connected to an output of the optical amplifier, said output optical power monitoring circuit converting light at an output of the optical amplifier into an output power measurement, Pout, representative of the optical power output from the at least one stage of the optical amplifier;

a pump drive circuit operatively connected to said input power monitoring circuit, said output power monitoring circuit and the at least one pump laser, said pump drive circuit driving the at least one pump laser with a pump drive current determined according to a difference between Pin*Gset and Pout to substantially achieve constant gain control of the optical amplifier, wherein Gset is a gain set value.

20. The optical amplifier control apparatus according to claim 19, said pump drive circuit increasing the pump drive current being supplied to the at least one pump laser up to a limit determined by the difference between Pin*Gset and Pout.

21. The optical amplifier control apparatus according to claim 19, said pump drive circuit including:

a gain set amplifier operatively connected to said input optical power monitoring circuit and to said gain set port, said gain set amplifier amplifying the input power measurement by the gain set value, Gset, to generate a desired output power value;

a transient control error amplifier operatively connected to said gain set amplifier and to said output optical power monitoring circuit, said transient control error amplifier generating a transient control error value based on a difference between the desired output power value generated by said gain set amplifier and the output power measurement; and a selector node operatively connected to said transient control error amplifier, said selector node increasing an output thereof to a value limited by the transient control error value, wherein the output of said selector node is supplied to the at least one pump laser of the optical amplifier.

* * * * *